United States Patent [19]

Hertrich

[11] 4,208,679
[45] Jun. 17, 1980

[54] TRANSDUCER POSITIONING SYSTEM FOR ROTATING DISK DRIVE UNITS

[75] Inventor: Friedrich R. Hertrich, Boulder, Colo.

[73] Assignee: Digital Equipment Corporation, Maynard, Mass.

[21] Appl. No.: 882,127

[22] Filed: Feb. 28, 1978

[51] Int. Cl.² ............................................. G11B 21/10
[52] U.S. Cl. ...................................................... 360/77
[58] Field of Search ...................... 360/48, 49, 77, 78

[56] References Cited

U.S. PATENT DOCUMENTS

| | | | |
|---|---|---|---|
| 3,936,876 | 2/1976 | Taylor | 360/78 |
| 3,994,016 | 11/1976 | Moghadam | 360/78 |
| 4,032,984 | 6/1977 | Kaser | 360/77 |
| 4,048,660 | 9/1977 | Dennison | 360/78 |
| 4,056,830 | 11/1977 | Smith | 360/77 |
| 4,072,990 | 2/1978 | Case | 360/78 |
| 4,101,942 | 7/1978 | Jacques | 360/77 |
| 4,115,823 | 9/1978 | Commander | 360/78 |

OTHER PUBLICATIONS

Rotating Record Disk for Initialization Sector Servoing, IBM Tech. Discl. Bull. vol. 20, No. 5, 10/77, p. 1789.

Primary Examiner—John H. Wolff
Attorney, Agent, or Firm—Cesari and McKenna

[57] ABSTRACT

A transducer positioning system for a rotating magnetic disk memory unit in which servo positioning information is interspersed with data. The disk comprises concentric data tracks individually divided into spaced data sectors. Two sets of radially extending blocks of servo information are recorded between each pair of adjacent data sectors. Adjacent blocks in each set produce asymmetrical pulse trains that are the time-displaced complements of each other. A first set of blocks are positioned radially so that their boundaries lie on the data track centerlines. Each block in the second set is aligned with a data track. A transducer positioning device utilizes the first blocks of information to maintain the transducer in alignment with a track and the first and second blocks of information in moving the transducer from one track to another.

20 Claims, 13 Drawing Figures

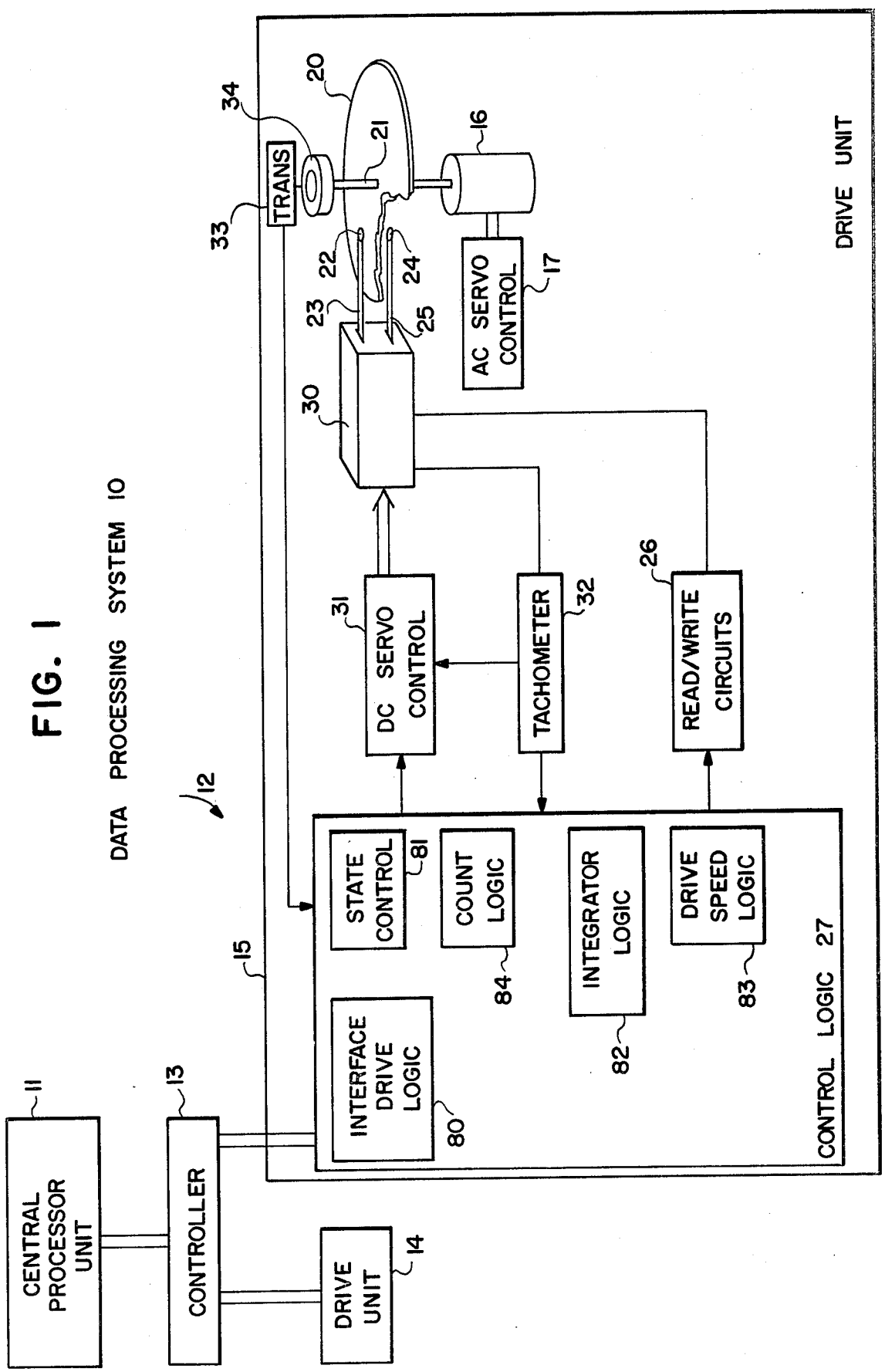

| MARKER | GET STATUS | SIGN | RESET ERR | HEAD Ø | TRACK DIFFERENCE |

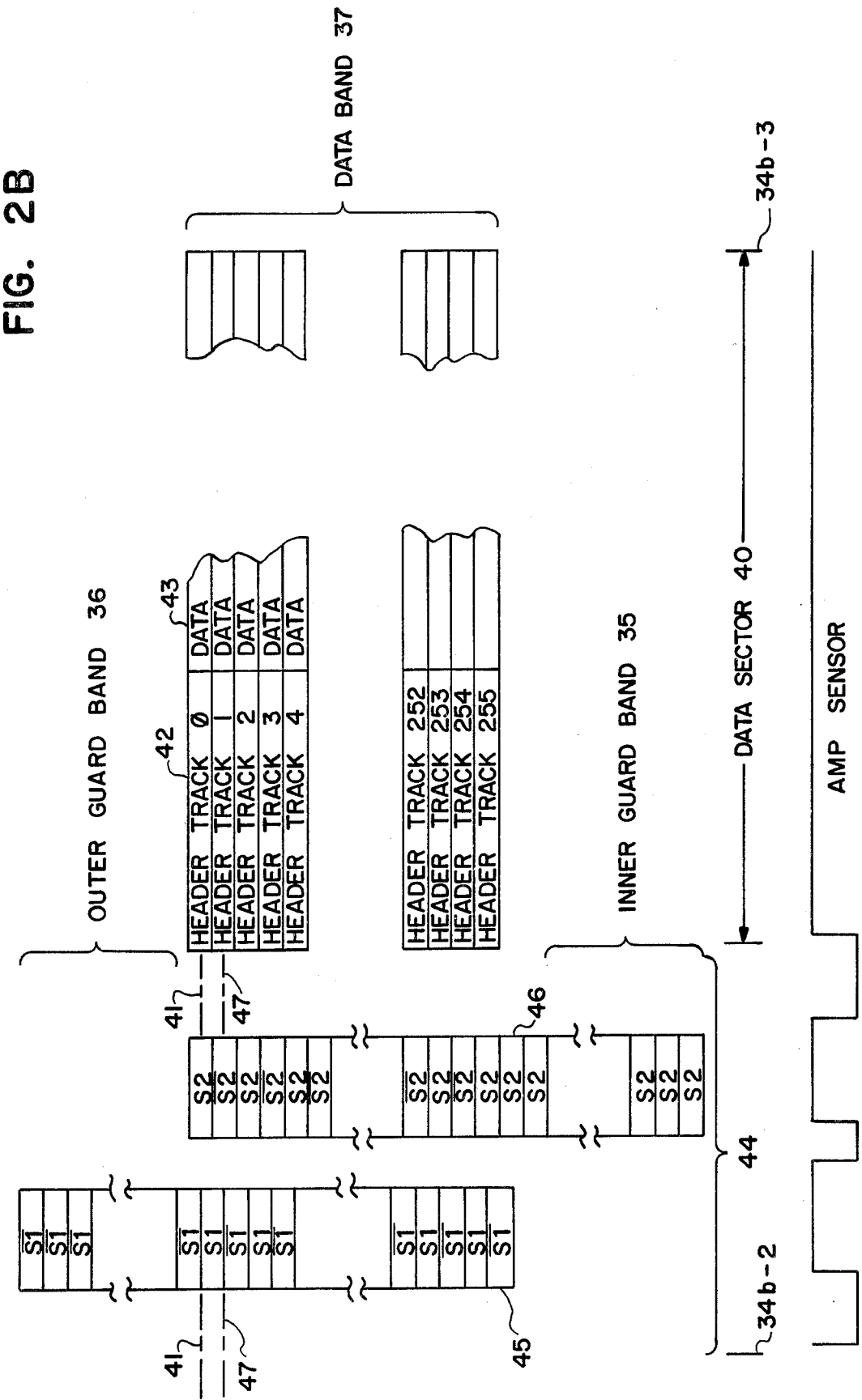

FIG. 2C
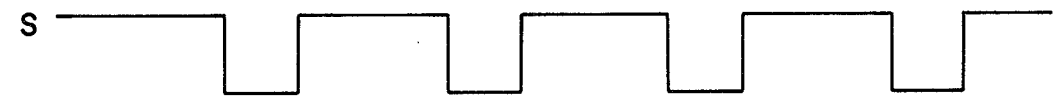
S
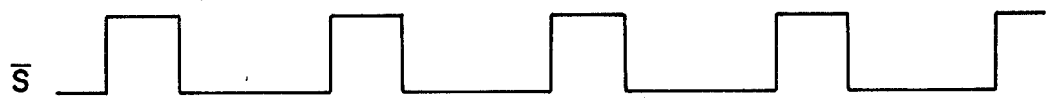
$\overline{S}$
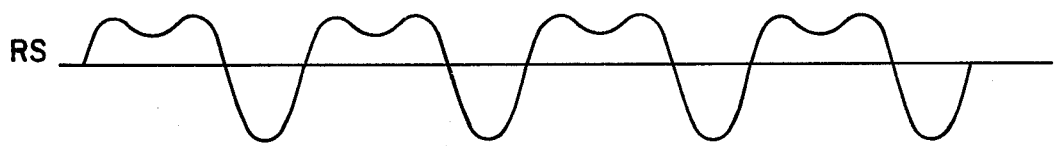
RS
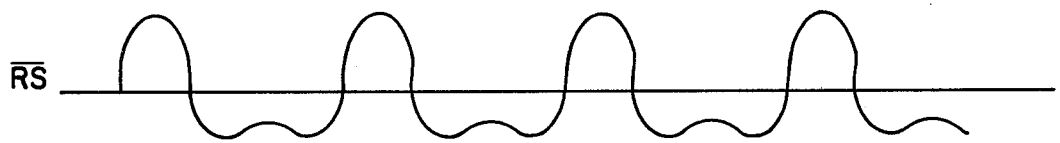
$\overline{RS}$
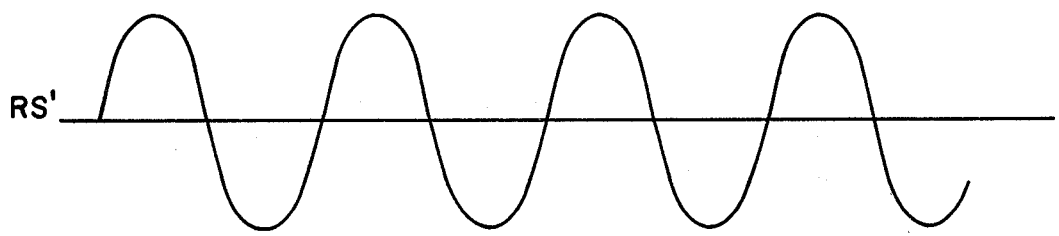
RS'
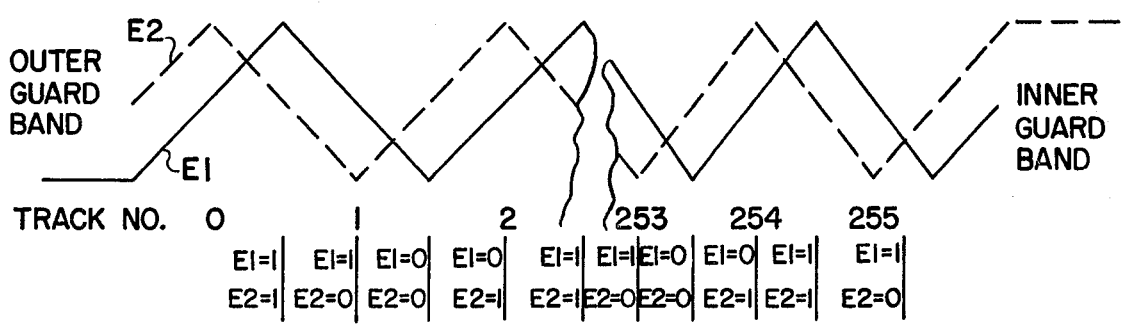
FIG. 3

TRANSDUCER POSITIONING SYSTEM FOR ROTATING DISK DRIVE UNITS

BACKGROUND OF THE INVENTION

This invention generally relates to magnetic disk memories and more specifically to a transducer positioning system for such disk memories.

A data processing system generally comprises one or more secondary storage facilities. Typically, such a facility includes a controller and one or more drives. This invention is particularly adapted to such a facility in which the drive comprises a magnetic disk medium for storing information on plural concentric data tracks.

A typical magnetic disk drive includes transducers, or read-write heads, and related control circuitry for transferring information from and to the media. The specific control circuitry varies, especially between two major categories of magnetic disk drives: namely, fixed head and movable head disk drives. In a fixed head drive, one transducer is positioned at each data track, whereas a single set of heads moves from track to track in a simple movable head drive. The duplication of heads in a fixed head drive is expensive. In some applications, however, the expense is justified because there is no "positioning" delay; i.e., the delay encountered while a head moves between tracks in a movable head drive. However, movable head drives are considerably less expensive because they eliminate head duplication. In most applications the inherent positioning delay is acceptable. This invention is applied to such movable head drives.

One of the important elements of a movable head drive is the servo system for locating, with accuracy, the heads over the data tracks. In large disk drives containing a number of different disks or records, corresponding data tracks on each record are in alignment and form a "cylinder". Normally, a photoelectric servo system controls the movement of the heads from one cylinder to a designated cylinder during a "seeking" operation. Another servo system uses servo information stored entirely on one servo surface of one record for "positioning" all the heads on the designated cylinder. The dedication of one surface to servo information can be tolerated in large drives as the percentage of available storage space used for storing data is still very large.

When the foregoing approach to transducer positioning is applied to small disks including one or two records, inefficiencies result. For example, a dedicated servo surface may consume 25% to 50% of the available storage space. Moreover, the cost of a photoelectric servo system assumes a significant portion of the overall disk cost. The net result is an increased cost per character of available storage, which is the primary economic measure of any disk drive. Several general categories of alternate positioning systems have been proposed to reduce these costs. In one category the disk drives use "in data servo information"; that is, each data track on the disk contains both data that is recorded in spaced data sectors and servo information that is recorded between the data sectors.

In one such drive, course and fine servo information is recorded sequentially between the data sectors. The fine servo information utilizes transitions to discriminate odd and even tracks and is used during positioning to maintain the heads on a designated track. For seeking during which the heads move from one track to another, three cells in each block are encoded to discriminate one of eight tracks. As the heads moved to a new track, these cells are decoded to determine the distance moved. The control circuitry decrements a difference counter depending upon the contents of those cells. In this approach, the servo data is offset by one-half track with respect to the data itself.

In another disk drive, first and second blocks of servo information are recorded across six tracks between the data sectors. There is no phase difference between the signals recorded in the blocks on adjacent tracks. Discrimination depends upon the "length" of the servo information block along the track. Thus, the control circuitry must precisely measure the interval for each block in order to identify its position.

The foregoing approaches require either a complex recording procedure and/or inclusion of complex and expensive decoding circuitry in order to provide accurate servo information. In another approach each track is divided into half tracks and contains circumferentially spaced blocks of servo information alternately recorded in each halftrack. The control circuitry measures and compares the amplitudes of the two blocks to determine whether the heads are centered on the track. It is necessary to move the heads quite slowly during seeking in this approach. If the heads cross more than one track during an interval between successive servo blocks, an ambiguity results because there is no inherent track identification in the servo information. Although this approach is easy to implement, its inherent slowness often leads to intolerable positioning delays.

Therefore, it is an object of this invention to provide a magnetic disk memory that utilizes in-data servo information in an efficient manner.

Another object of this invention is to provide a magnetic disk memory in which in-data servo data information allows the efficient implementation of both positioning and seeking operations.

Still another object of this invention is to provide a magnetic disk memory unit that can be constructed for a relatively low cost;

Yet another object of this invention is to provide a low cost magnetic disk memory device that is reliable in operation.

Summary

In accordance with this invention, a disk for a disk memory drive unit is divided into concentric tracks. Each includes plural, spaced data sectors and servo information in servo areas between each pair of data sectors. There are two sets of blocks of servo information associated with each servo area. Each set produces an asymmetrical pulse train, and the pulse trains in radially adjacent blocks are time displaced complements of each other. Blocks in a first set are offset from the data tracks so the boundaries between individual blocks lie on a centerline of each data track. Blocks in the second set are in radial alignment with the data tracks. Signals generated when these blocks of servo information pass transducers in the form of reading and writing heads, establish input information for a servo system that locates the heads over a specified data track.

This invention is pointed out with particularity in the appended claims. The above and further objects and advantages of this invention may be better understood by referring to the following description taken in conjunction with the accompanying drawings.

BRIEF DESCRIPTION OF THE DRAWINGS

FIG. 1 is a block diagram of a data processing system that incorporates a magnetic disk drive constructed in accordance with this invention;

FIGS. 2A and 2B depict a general organization of information on disk tracks that is useful in the drive unit shown in FIG. 1 while FIG. 2C includes various waveforms associated with that information;

FIG. 3 depicts the relationship of signals derived from information in the servo areas shown in FIGS. 2A and 2B;

FIG. 7 depicts the organization of a drive command word that is received by the circuitry shown in FIG. 6;

DESCRIPTION OF AN ILLUSTRATIVE EMBODIMENT

Figures 2A, 7:
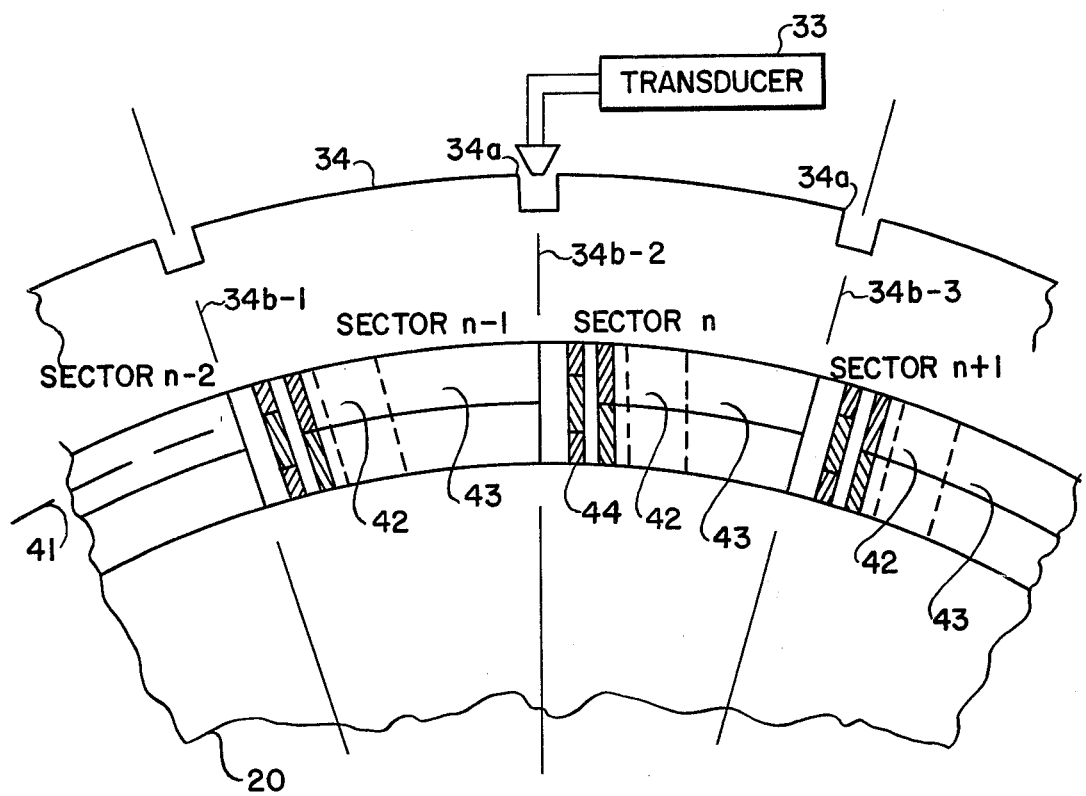

FIG. 1 depicts a data processing system 10 that includes a central processor unit 11 connected to a secondary storage facility 12. Other units such as input/output units form no part of this invention and are not disclosed. The secondary storage facility 12 includes a controller 13 and, in this particular embodiment, a drive unit 14 and a drive unit 15.

Only the drive unit 15 is shown in detail. It includes an AC motor 16 and an AC servo control circuit 17 that rotate the disk 20 on a spindle 21 at a constant angular velocity. The disk 20 comprises magnetic media on each surface that is divided into a series of concentric tracks for storing data in spaced data sectors at each track. Signals corresponding to this information (i.e., reading signals) or for altering this information (i.e., writing signals) are provided by transducers. In this specific embodiment, a transducer in a form of an upper read/write head 22 is positioned adjacent the upper surface of the disk 20 by an arm 23. A lower read/write head 24 supported by an arm 25 is disposed adjacent the lower surface of the disk 20. Reading and writing signals are transferred between the heads and the controller 13 through read/write circuits 26 and control logic 27 which connects to the controller 13. The controller 13 and control logic 27 generally use conventional techniques for transferring information to and from the media.

A head positioner 30 moves the heads 22 and 24 from one track to another and centers the heads over a selected track. It may comprise a "voice coil" or other known linear motion device which moves the arms 23 and 25 across the surfaces of the disk 20. The remaining circuitry in FIG. 1 provides two basic functions that are important to this invention. The first is a seeking function during which the positioner 30 moves the heads 20 and 24 from one track to another. The second is a positioning function in which the positioner 30 centers the heads 22 and 24 at the selected data track. A DC servo control circuit 31, that energizes the positioner 30 during both seeking and positioning operations, responds to signals from a tachometer 32 and the control logic 27. The tachometer generates signals representing the velocity at which the heads 22 and 24 are moving.

Each drive unit also includes a transducer 33 and a metallic plate 34 that mounts to the spindle 21. The plate 34 has a plurality of equiangularly spaced notches disposed about its periphery as shown in FIG. 2A. In one embodiment, each track comprises forty circumferentially spaced data sectors so the angle between adjacent notches 34A is 9°. Radii 34b-1, 34b-2, etc. extend through the centers of the respective notches. In this embodiment, each radius also is aligned approximately with the end of a preceeding data sector. In addition, each data track lies on a track centerline.

Data sector "n", designated by reference numeral 40, is typical. It is radially centered on a track centerline 41 and includes, as shown in both FIGS. 2A and 2B, a header portion 42 and data portion 43. Sector "n" also is spaced from each of the adjacent sectors "n−1" and "n+1" on the track and the beginnings of the intervening spaces essentially are aligned with the centers of the notches in the plate 34. Blocks of servo information are recorded in the spaces between the adjacent sectors, a servo space 44 between sectors "n−1" and "n" being typical.

FIG. 2B shows the organization of the tracks and servo space 44 that lie between successive radial boundaries 34b-2 and 34b-3 in FIG. 2A. In FIG. 2B, the tracks at the bottom lie at the center of the disk and constitute an inner guard band 35, while outer tracks at the top constitute an outer guard band 36. The tracks intermediate the guard bands 35 and 36 are data tracks and form a data band 37. In this specific embodiment there are 256 data tracks in the data band 37 and, as previously indicated, each data track includes forty sectors.

As each data sector 40 has a conventional organization of header information and data, the following discussion is limited to the organization of the servo spaces, such as in the servo space 44. The servo information is recorded in two radially extending sets of blocks 45 and 46. Each block contains a "burst" of several cycles of an asymmetrical pulse train of a predetermined duty cycle. In one specific embodiment, one burst comprises flux reversals that are produced by recording a reference square wave with approximately a 67% "duty cycle". The "duty cycle" is the proportion of the cycle time that the signal is positive. A corresponding square wave "S" is shown in FIG. 2C. A radially adjacent burst is recorded using a complementary pulse train displaced 180° in phase from the reference clocking signals. This square wave is designated "$\overline{S}$" in FIG. 2C and it has approximately a 33% duty cycle.

As known, various bandwidth limitations and other factors distort a square wave when it is recorded on a disk and further distort the recovered signal. In FIG. 2C the RS and $\overline{RS}$ waveforms correspond to the signals that are generated by differentiating the signal from a read/write head when it passes over a recording of the S and $\overline{S}$ pulse trains respectively.

In the set 45, the blocks are designated S1 and $\overline{S1}$ indicating that they are recorded in response to the S and $\overline{S}$ signals respectively. Similarly, the blocks in the set 46 are designated as S2 or $\overline{S2}$, blocks indicating that too they are recorded with the S and $\overline{S}$ signals respectively.

Still referring to FIG. 2B, in the data band 37, each block in the set 46 is centered on a centerline of a data track and adjacent blocks alternately are S2 and $\overline{S2}$ blocks. In this specific embodiment, the S2 blocks are radially aligned with the even-numered tracks; and the $\overline{S2}$ blocks, with odd-numbered tracks. The blocks of set 46 also extend through the inner guard band 36, but in the inner guard band they all are S2 blocks. No blocks in the set 46 appear in the outer guard band 35.

With respect to the set 45, there are no blocks in the inner guard band 36. In the data band 37 the blocks in the set 45 are radially offset by one-half track from the data tracks and the S2 blocks. Adjacent blocks, in the set 45 are recorded alternately with the S1 and $\overline{S1}$ signals. Thus, with this radial offset, the boundaries between adjacent blocks in the set 45 are on the data track centerlines. These blocks continue into the outer guard band 36, but there they contain only $\overline{S1}$ signals.

Each read/write head spans one track in the radial, or transverse, direction. If the head overlies one of the S1 or S2 blocks, the induced voltage is differentiated, and the differentiated voltage has the RS waveshape in FIG. 2C. On the other hand, the differentiated voltage has the $\overline{RS}$ waveshape where it overlies one of the $\overline{S1}$ or $\overline{S2}$ blocks. The duty cycles of the RS and $\overline{RS}$ signals approximate the duty cycles of the S and $\overline{S}$ signals respectively.

When a head overlies equal portions of two adjacent blocks, the differentiated voltage is depicted by the RS' curve in FIG. 2C because the head sums the voltages induced by the adjacent halves of the adjacent blocks. That is, since the head spans one-half of each of adjacent blocks, the differentiated summed signal approximates a sine wave with a 50% duty cycle. By inspection of FIG. 2C, it therefore will be apparent that the duty cycle of the differentiated voltage varies from a minimum when it overlies a block recorded in response to the S signal to a maximum when it overlies a block recorded in response to the $\overline{S}$ signal. Moreover, the duty cycle varies approximately linearly as head moves radially across adjacent blocks.

As previously indicated, the boundaries of the adjacent blocks in the set 45 lie on the track centerlines. Thus, any deviation from a 50% duty cycle of the signal induced in the heads while the set 45 passes is a measure of head misalignment. Indeed, as described later, this signal is used by the DC servo control circuit 31 to maintain the heads in a proper position with respect to the tracks during a positioning operation.

If the integral of the differentiated voltage over several cycles of the servo signals in each block for successive radial positions of the head is plotted as a function of radial head position, the waveforms in FIG. 3 result. More specifically, the E1 waveform represents conceptually the variations of the integrals of the differentiated voltages produced by the recording in the blocks of the set 45; the E2 waveform, differentiated voltages produced by the recordings in the blocks of the set 46.

The conceptual E1 waveform, corresponding to the set 45, makes a positive zero crossing as the head moves across track 0 from the outer guardband toward the inner guard band, and a negative zero crossing at track 1. From this graph it is thus evident that there is a positive zero crossing of this waveform at all the even tracks and a negative zero crossing at all the odd tracks so long as the head travels radially inward, i.e., toward the inner guard band. When the head moves in the reverse direction, the positive and negative zero crossings correspond to odd and even tracks, respectively.

The conceptual E2 waveform, corresponding to the set 46, is displaced from the E1 waveform and reaches maxima or minima when the head is centered over a data track and undergoes zero crossings when the head is midway between data tracks. Hence, the E1 and E2 waveforms have a space quadrature relationship and inherently define exact changes in position when they are sampled in succession and values of 1 and 0 are assigned to positive and negative polarities respectively. For example, if the heads are located within one-half track to the right of track 0, the E1 and E2 values are both 1's, as shown in FIG. 3.

If the head moves another half track, E2 changes to 0. Assuming that tracks are counted at the zero crossings of E2 (i.e., when the value of E2 changes) and the values of E1 and E2 both remain at 0, a number of possibilities exist: (1) the heads may not have crossed a track; (2) the heads may have moved to a position in the vicinity of track 2; or (3) the heads may have moved to any other even-numbered track. Likewise, if values of E1=1 and E2=1 change to E1=0 and E2=0, the heads may have crossed 1, 3 or some other odd number of tracks. A change from E1=0 and E2=0 to E1=1 and E2=0 indicates a possible two-track or four-track move.

Any ambiguity introduced by the E1 and E2 waveform can be settled by measuring the velocity of the heads if the servo areas are read on a regular sampling basis. Moreover, the measurement of velocity can be quite coarse. For example, if the average velocity is between 1.5 and 2.5 tracks per sample period, the heads have traversed 2 tracks in the first example. If the heads travel at a velocity that lies in a range from 0 to an upper limit of about four tracks per sample period, a four track displacement would be indicated.

A complete analysis of the changes that can be monitored will show that there are sixteen basic conditions established for different values of E1 and E2 for two successive samples. Moreover, if the velocity is limited to under five tracks per sampling period, the various combinations of the E1 and E2 waveforms define 64 possible track displacements, 32 being for displacements in each direction.

This information is used during seeking operations to determine the position of the heads each time the heads encounter one of the servo areas. The total track displacement can be determined even if the heads move over two or more tracks between successive samples of successive servo areas. This ability to resolve these displacements with predictability allows the construction of a low cost, reliable disk drive unit that can store information at a low cost per character.

With this understanding of the underlying theory of operation of this invention, it it possible to describe a typical disk drive unit as shown in FIG. 1 by referring to the different circuit elements in detail. In the absence of a circuitry signal on the WRITE GATE line in FIG. 6, the read/write circuits 26 in FIG. 4 operate in a reading mode. This is true as the servo spaces 44 pass the heads. Signals from the selected ones of the heads 22 and 24 pass through a head selection circuit 50 that responds to a HEAD SEL 0 signal from the control logic 27 in FIG. 1. Signals from the selected head pass through signal conditioning circuits 51 that amplify, filter and differentiate the signals. These signals then are applied to zero crossing detectors 52 and 53 which sense the zero crossings of the induced voltage and trigger pulse generators 54 and 55 that produce DATA 1 and DATA 2 pulses at corresponding ones of the negative and positive zero crossings.

The signals from the circuits 51 also are compared with a signal from a reference 56 in amplitude sensor level detectors 60 and 61. A threshold circuit 62 generates an AMP SENSOR signal after the leading edge of any information passes the head. The AMP SENSOR signal therefore tends to discriminate noise from actual signals and is asserted three different times during each sector as shown in FIG. 2B. More specifically, it identifies the passage of the sets 44 and 45 and the data sector 40. The DATA 1, DATA 2 and AMP SENSOR signals pass through the read/write circuits 26 into the control logic 27.

Figure 5:
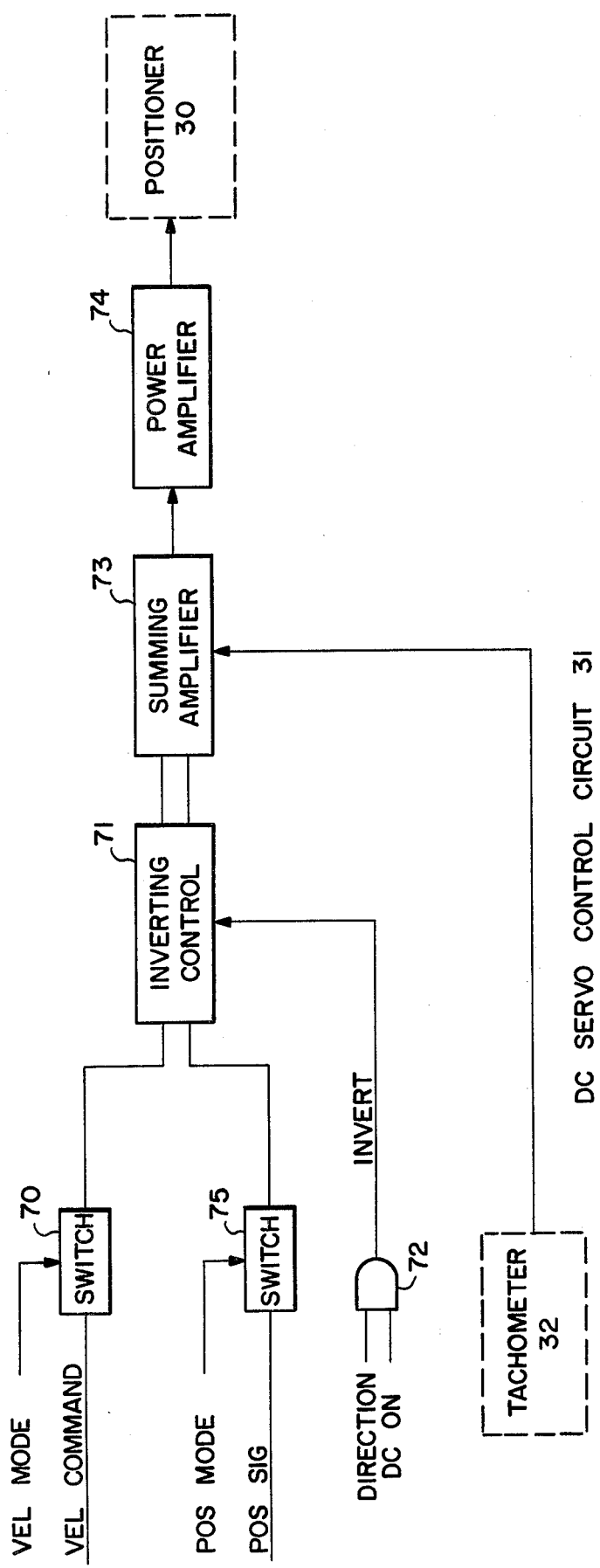
FIG. 5 is a detailed block diagram of the dc servo control circuit shown in FIG. 1.

The DC servo control circuit 31 is shown in FIG. 5. During a seeking operation, the control logic 27 generates a VEL MODE signal which closes a switch 70 to couple a multiple-level VEL COMMAND signal to an inverting control circuit 71. The inverting control 71 responds to a DIRECTION signal that is coupled to the inverting control 71 through an AND gate 72 whenever a DC ON signal is asserted, indicating that the DC power level is at an acceptable level. The signals from the inverting control 71 then are combined with signals from the tachometer 32 to produce a driving signal for a power amplifier 74 that, in turn, energizes the positioner 30 to relocate the selected head to the desired track position, whereupon the VEL COMMAND signal is reduced nearly to zero.

Once the positioner 30 moves the heads to the appropriate track and reduces the velocity, the control logic 27 terminates the VEL MODE signal and asserts a complementary POS MODE signal. This signal enables a switch 75 to couple a POS SIG signal to the inverting control 71 and thereafter the positioner 30 moves the heads 22 and 24 to a final position and maintains the POS SIG signal at a null value.

Referring again to FIG. 1, the control logic 27 comprises a number of circuits. For purposes of understanding this invention, this circuitry can be classified as an interface-drive logic circuit 80, a state control circuit 81, an integrator logic circuit 82, a drive speed logic circuit 83 and a count logic circuit 84.

Figure 6:
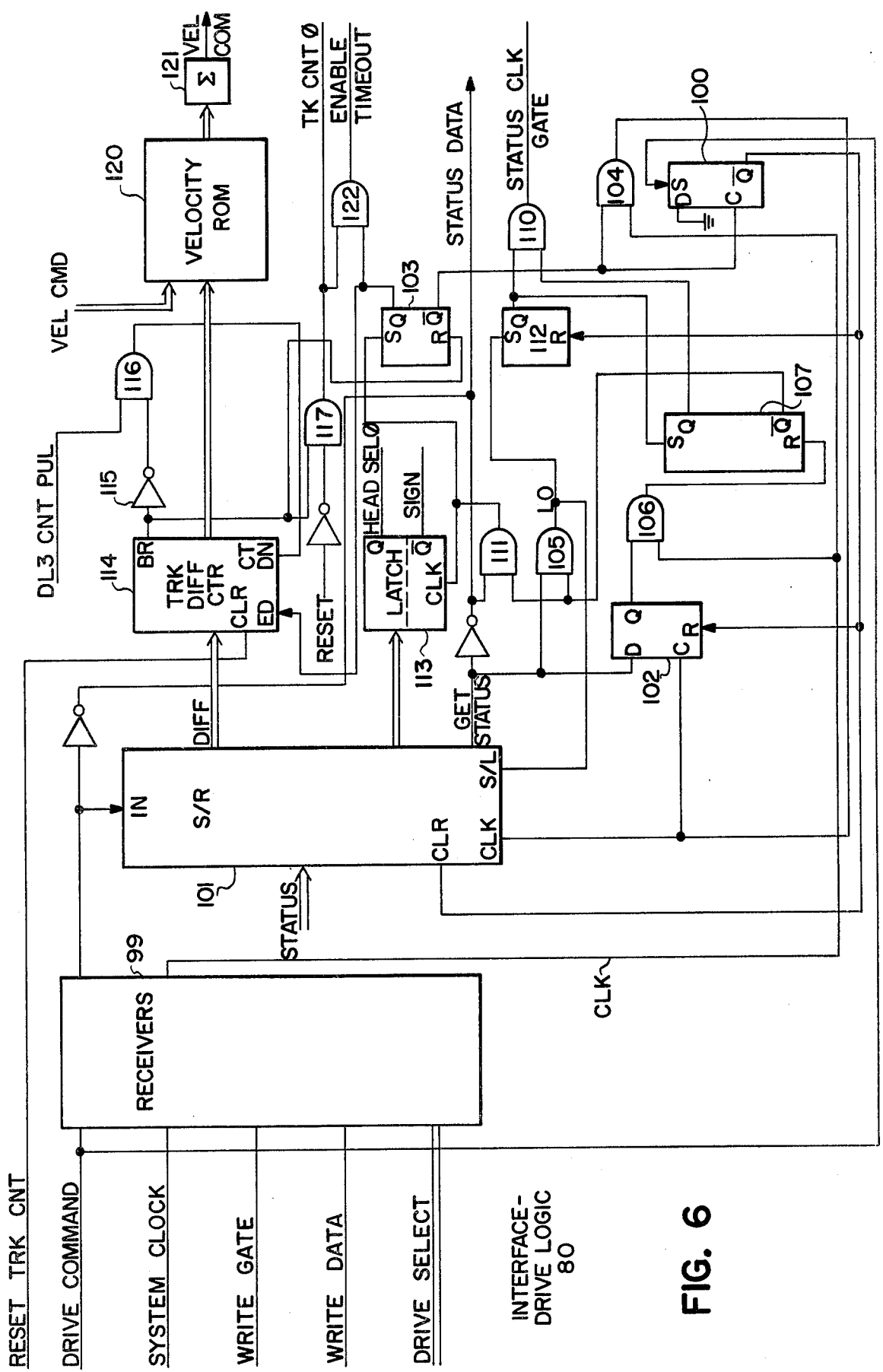
FIG. 6 is a detailed logic diagram of the interface-drive logic circuit shown in FIG. 1.

The control of transfer of information to and from a disk is produced in response to a number of signals that are received from the controller by receivers 99 in the interface drive logic circuit 80 shown in FIG. 6. In this drawing only a single line is shown for each signal. Two lines generally are used to enable a differential transmission of signals. These signals include a SYSTEM CLOCK pulse train which the receivers 99 convert to CLK pulses. The previously mentioned WRITE GATE signal controls whether a reading (transfer from the media) or writing (transfer to the media) operation occurs over the data sectors. WRITE DATA line transfers data to the medium during a writing operation. DRIVE SELECT signals identify which one of plural drive units connected to a single controller is to be used in a transfer. A controller initiates any exchange of data with the disk drive unit by transmitting a DRIVE COMMAND word shown in FIG. 7, over a corresponding line serially by bit. The first bit is always a ONE and is a MARKER bit. The other bits in a DRIVE COMMAND are interpreted as follows:

(1) A GET STATUS bit is asserted to transfer status information back to the controller; when the GET STATUS bit is not asserted, the incoming word is interpreted as a request to perform some other operation in response to other bits in the DRIVE COMMAND word.

(2) A SIGN bit is asserted to indicate that the heads are to move toward the inner guard band and is not asserted to indicate the heads are to move toward the outer guard band; it is interpreted when the GET STATUS bit is not asserted.

(3) A RESET ERROR bit is asserted to clear error conditions.

(4) A HEAD 0 bit is asserted to select the head 22 and is not asserted to select the head 24 for an ensuing operation; it is interpreted when the GET STATUS bit is not asserted.

(5) TRACK DIFFERENCE bits identify the number of tracks to be moved during a seeking operation; this difference is used in conjunction with the SIGN bit to control the signals to the positioner 30 in FIG. 1.

When the MARKER bit appears on the DRIVE COMMAND line, it presets a clear latch 100 to remove an overriding clearing signal from various registers and circuits including a shift register 101 and a marker latch 102.

As described later, a track difference load latch 103 is cleared prior to the receipt of a DRIVE COMMAND. It therefore enables CLK pulses to pass through an AND gate 104 to shift the DRIVE COMMAND into and through the shift register 101. Serial shifting is enabled by a disabled AND gate 105.

These bits in the DRIVE COMMAND word shift through the shift register 101 until the MARKER bit is clocked into the marker flip-flop 102. The next CLK pulse then energizes an AND gate 106 to clear a marker latch 107 thereby simultaneously disabling an AND gate 110 and enabling the AND gate 105 and an AND gate 111. If the GET STATUS bit is asserted, the AND gate 105 presets a status latch 112 that was cleared by the latch 100. The status latch enables the AND gate 110 and presets the marker latch 107 thereby to enable circuitry, that is not shown, to generate status clock pulses to transfer status information back to the controller 13.

When the GET STATUS bit is not asserted, the status latch 112 remains cleared and disables the status clock AND gate 110. However, the AND gate 111 is energized and clocks a two-stage latch 113 thereby to store the SIGN and HEAD SEL 0 signals. Simultaneously, the AND gate 111 sets the track difference counter load latch 103 that performs three functions. First, it loads the TRACK DIFFERENCE bits in parallel from the shift register 101 into a track difference counter 114; it also disables the AND gate 104 thereby terminating the CLK pulses that are coupled to the shift register 101 and the marker latch 102; thirdly, it conditions the latch 100 to be cleared when the latch 103 is reset.

Normally a BORROW (BR) output from the track difference counter 113 is not asserted. Thus, whenever the heads are not properly positioned, an inverter 116 enables an AND gate 116 to couple CNT PUL pulses to the count-down input of the counter 113 thereby decrementing the counter on the leading edge of each CNT PUL pulse. When the difference in the counter 113 does reduce to zero, the trailing edge of CNT PUL pulse causes the counter 113 to assert the BR signal. The BR signal disables the AND gate 116 and prevents any further change in the counter 113. However, the BR signal also energizes an AND gate 117 that generates a TK CNT 0 signal that indicates the selected head is at the desired track. The TK CNT 0 signal also energizes an AND gate 117 to transmit an ENABLE TIME OUT signal that initiates a timing interval during which the heads must stay within a final position for reading or writing information.

The output signals from the track difference counter constitute address signals to a read-only velocity memory 120. VEL CMD signals from the state control circuit 81 constitute other address signals. The memory 120 stores, among other things, different numbers that correspond to discrete velocities. These signals are coupled to a summing circuit 121 where they are weighted and summed to generate the multiple level DC VEL COM signal that is transferred to the switch 70 in FIG. 4. The magnitude of the VEL COM signal decreases as the number from the track difference counter is reduced to zero. In one embodiment, the VEL COM signal establishes a velocity of 33 inches per second (ips) where the track difference is greater than 40 and decreases the velocity to about 3 ips at a one-zero track difference.

Figure 8:
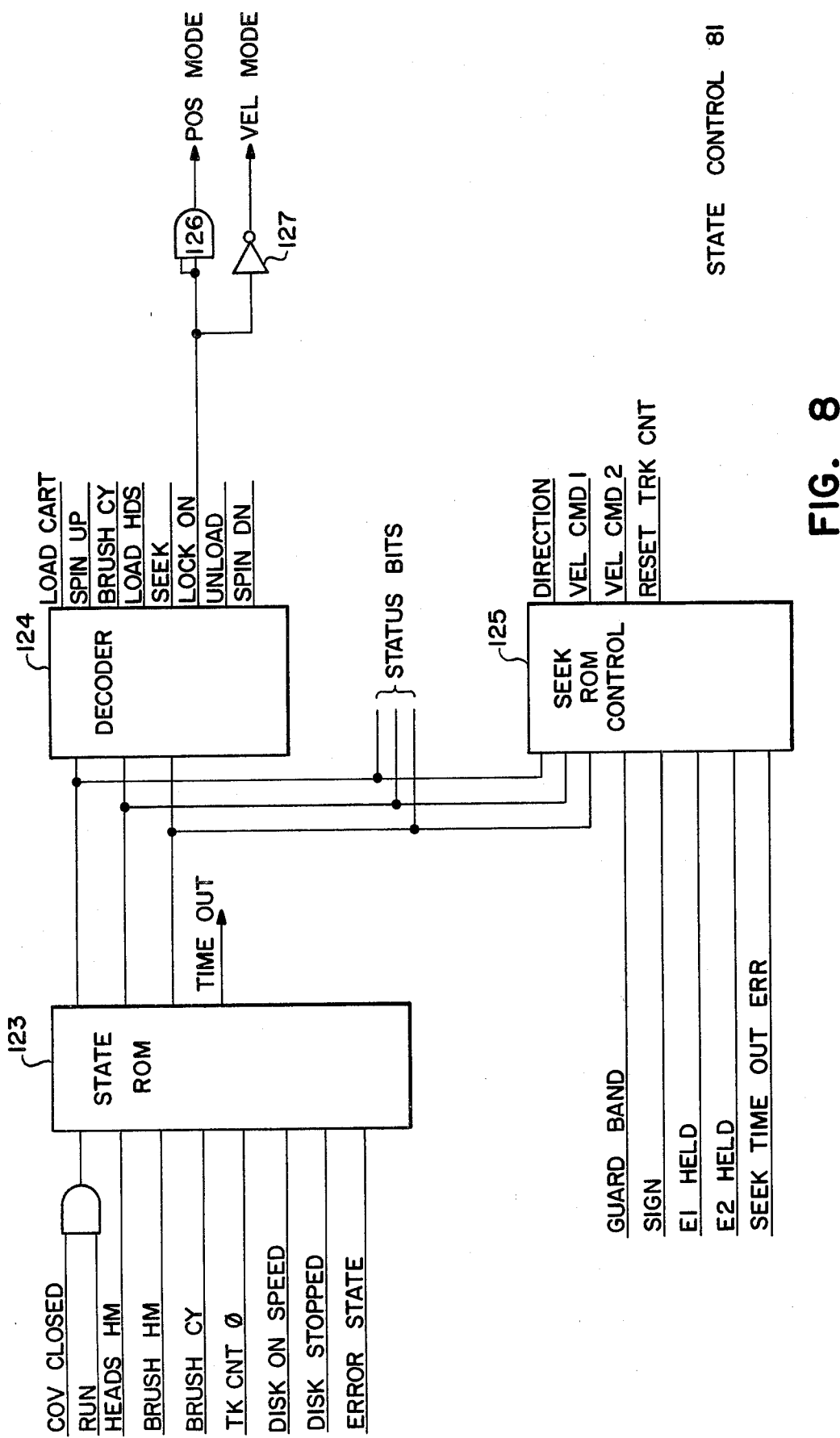
FIG. 8 is a detailed logic diagram of the state control circuit shown in FIG. 1.

Now referring to FIG. 8, the TK CNT 0 signal from the AND gate 117 in FIG. 6 is applied to a state read-only memory 123. The memory 123 also receives a number of other signals indicating the status of the drive. These include a COV CLOSED signal that indicates that an access door is closed. A RUN signal is generated by a control panel switch on the disk. A HEADS HM signal indicates that the heads are at a home position. BRUSH HM and BRUSH CY signals indicate, respectively, whether the brushes have been retracted to a home position or whether the brush motor is being actuated during a brush cycle. A DISK STOPPED signal indicates that the disk has stopped and an ERROR STATE signal indicates that an error condition exists. All these signals constitute addresses to the state read-only memory 123.

In this particular embodiment, the possible generalized conditions which these input signals define can be specified by four binary bits. A decoder 124 and a seek read-only memory control 125 receive corresponding output signals from the memory 123 and, in conjunction with other signals, decode these signals.

The decoder 124 defines, in this specific embodiment, eight of those conditions. These include a LOAD CART state during which the drive needs a disk cartridge that carries the disk itself. SPIN UP and SPIN DN signals indicate, respectively, that the disk is accelerating to or decelerating from its operating speed. The BRUSH CY signal that indicates a BRUSH CYCLE is being performed. A LOAD HDS signal indicates that the heads are being moved to a home position. A SEEK signal indicates that a seeking operation is underway whereas a LOCK ON signal indicates that the heads have moved to a designated track (i.e., the track differene has been reduced to zero). An UNLOAD signal indicates that the heads are being retracted.

The state read-only memory 123 also produces a TIME OUT signal under certain operating conditions. The signals that are applied to the decoder 124 are also applied to the seek read-only memory control 125 for purposes that are described later.

A particular interest at this point, is the LOCK ON signal. It responds to DISK ON SPEED and TK CNT 0 signals. When the LOCK ON signal is asserted, a buffer gate 126 generates the POS MODE signal that is applied to the switch 75 in FIG. 5. Whenever the LOCK ON signal is not asserted, an inverter 127 asserts the VEL MODE signal that is applied to the switch 70 in FIG. 5.

Figure 9:
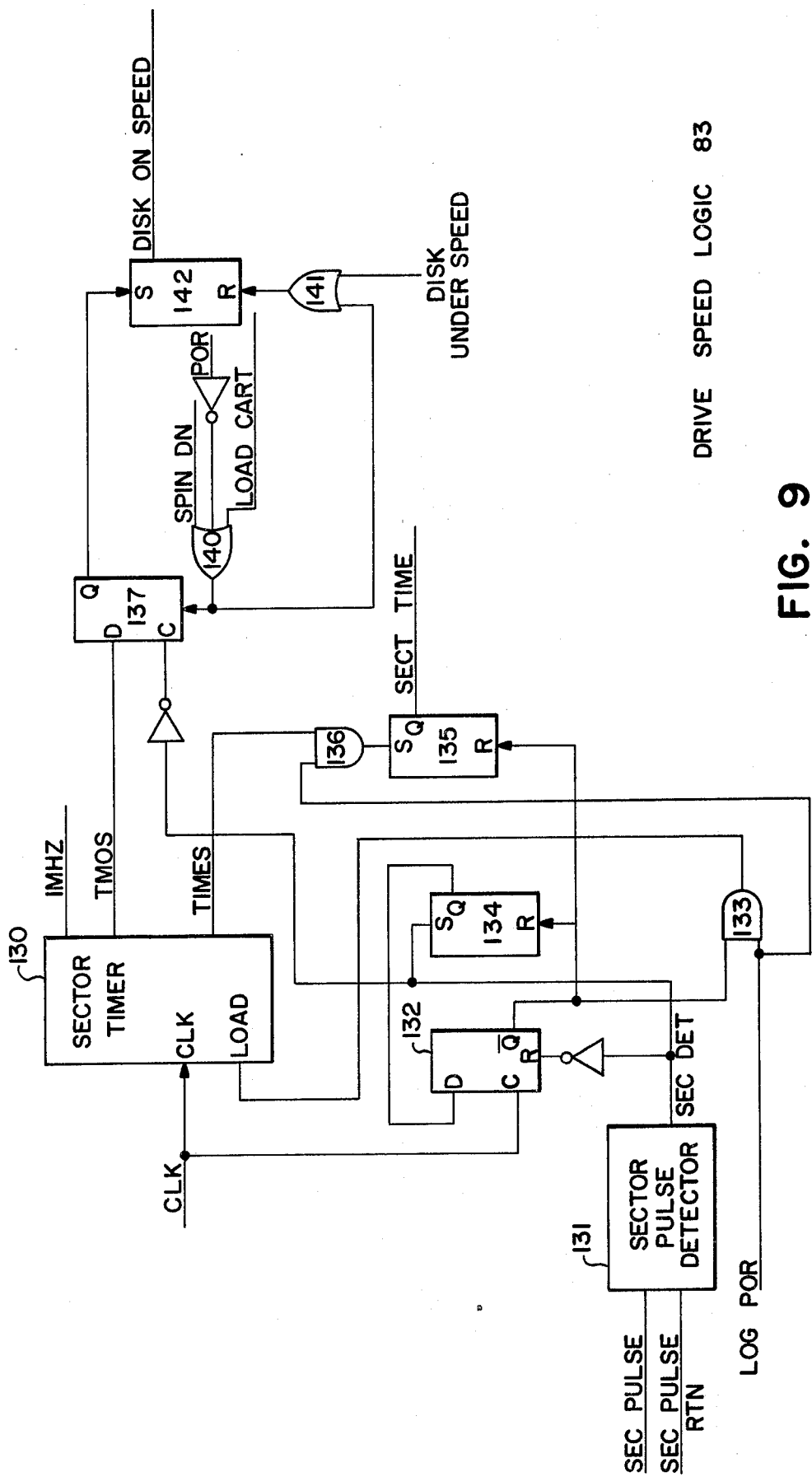
FIG. 9 is a detailed logic diagram of drive speed logic circuit in FIG. 1.

The DISK ON SPEED signal is generated by the drive speed logic circuit 83 shown in FIG. 9. This circuitry operates in response to CLK pulses from the receivers 99 in FIG. 6 and SEC PULSE and SEC PULSE RTN signals generated by a circuitry associated with the transducer 33 shown in FIGS. 1 and 2A. This circuitry includes a sector timer 130 comprising a counter and associated decoding circuitry to identify different time intervals.

Referring now again to FIG. 2A, each notch cut in the plate 34 is centered at approximately the the boundary between a prior data sector and the space containing the servo information. As one notch is centered on the radius $34b$-1 and its right and left edges are positioned so that the center of the notch is in alignment with the trailing edge of the data sector "n-2". In one embodiment the transducer 33 comprises a reluctance pickup and the associated circuitry transmits a SEC PULSE pulse when the left edge passes and a SEC PULSE RTN pulse when the right edge passes. A sector pulse detector 131 in FIG. 9 produces an SEC DET signal approximately midway between the SEC PULSE and SEC PULSE RTN pulses.

While the transducer is positioned between notches, the SEC DET signal is not asserted so that a flip-flop 132 is held in a reset condition. While the flip-flop 132 is reset, it energizes an AND gate 133 that enabled by a power supply status (LOG POR) signal. The AND gate 133, in turn, energizes the LOAD input of the counter in the sector timer 130 thereby to disable it.

When the sector pulse detector 131 generates the SEC DET signal 7 it removes the overriding resetting signal from the flip-flop 132 and sets a latch 134. Setting the latch 134 conditions the flip-flop 132 to be set by the next CLK pulse. Setting the flip-flop 132 removes an overriding reset signal from a sector time latch 135. When the sector timer 130 produces a TIMES signal during the interval required for the space between adjacent data sectors to pass the transducer 33, it energizes an AND gate 136 and sets the latch 135 to generate the SECT TIME signal. When the trailing edge of the notch passes the transducer 33, the sector pulse detector 131 responds to the SEC pulse RTN pulse by terminating the SEC DET signal. The flip-flop 132 then resets, and the SECT TIME signal from the latch 135 terminates.

Although the SECT TIME signal is generated under all operating conditions, it cannot be used until the remaining circuitry in FIG. 9 indicates that the disk at a proper operating speed. More specifically, the trailing edge of each SEC DET signal sets a flip-flop 137 when a TMOS signal indicates that a interval has elapsed that enables the disk to reach its proper operating speed. This circuitry also operates only if the system is accelerating. If it is decelerating, the SPIN DN signal energizes an OR gate 140 to reset the flip-flop 137. If the power is off or the disk is removed, a POR signal or the LOAD CART signal, respectively, also energizes the OR gate 140.

If the none of these conditions exist, the flip-flop 137 sets, and in turn, sets a latch 142 that generates the DISK ON SPEED signal. Under this condition, which represents a normal disk operation, the TK CNT 0 then controls whether the LOCK ON signal generated by the state control circuit 81 in FIG. 8 is asserted or not.

Figure 4:
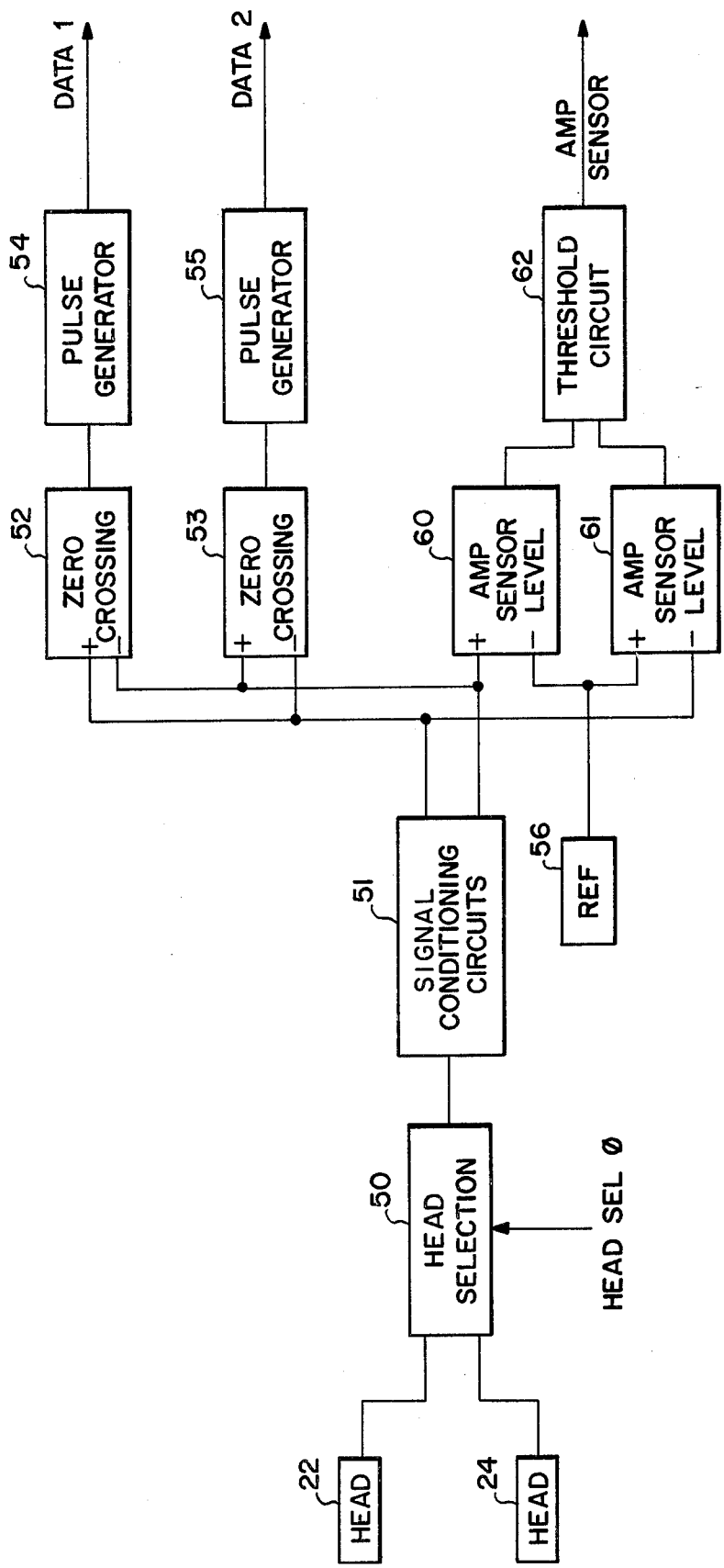
FIG. 4 is a detailed block diagram of the read/write circuits shown in FIG. 1.
Figure 10:
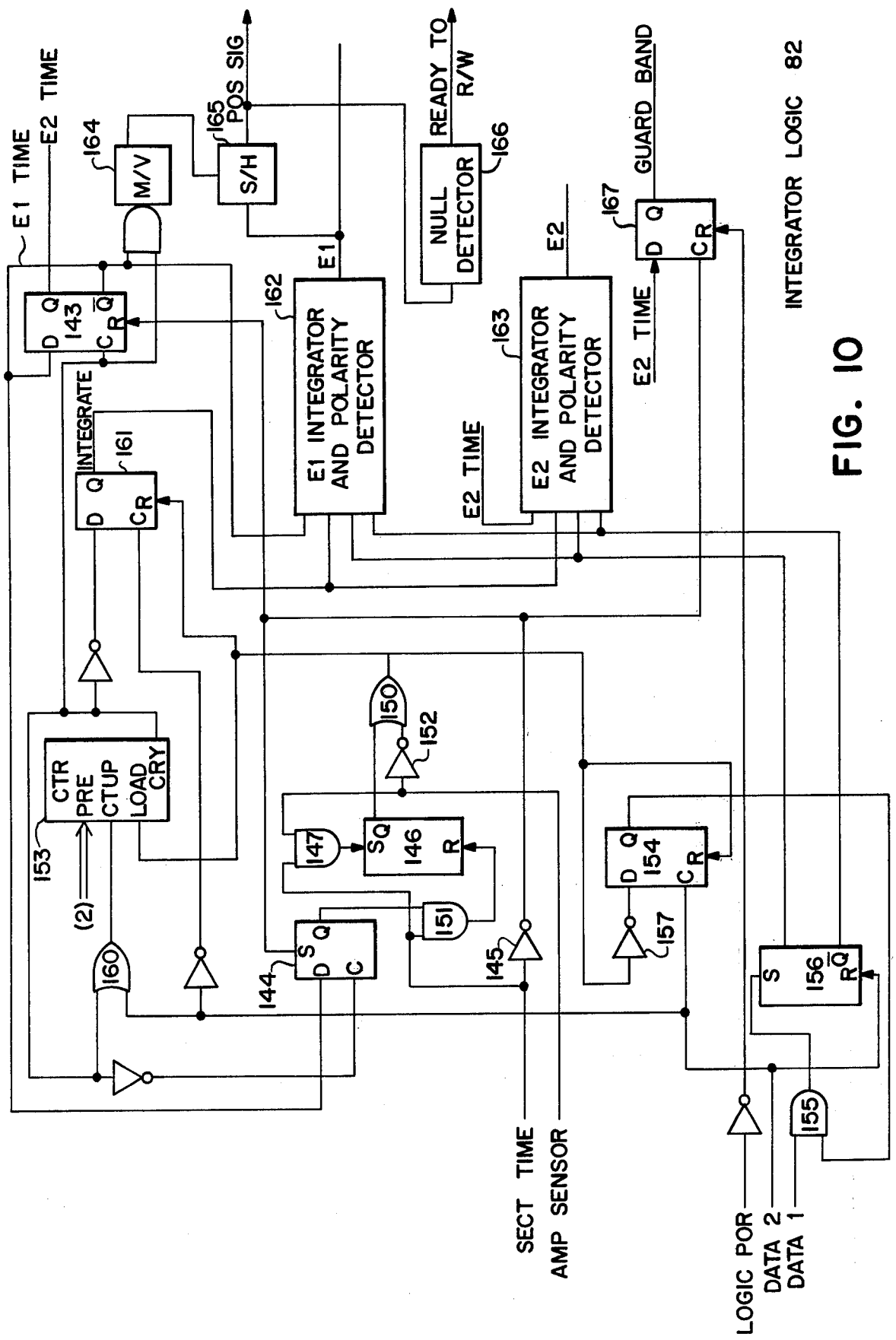
FIG. 10 is a detailed logic diagram of the integrator logic circuit shown in FIG. 1.

FIG. 10 depicts the integrator logic circuit 82 that responds to the DATA 1, DATA 2 and AMP SENSOR signals from the read-write circuits 26 shown in FIG. 4 and the SECT TIME signal from the drive speed logic 83 shown in FIG. 9. While a data sector is being read, the SECT TIME signal is not asserted, but the AMP SENSOR signal is asserted. The SECT TIME signal clears an E2 time flip-flop 143 and presets a circuit enabling flip-flop 144 after passing through an inverter 145. In its reset state, the flip-flop 143 asserts an E1 TIME signal. A latch 146 is preset at this time, although an AND gate 147 that generates a presetting signal is disabled. The latch 146 therefore energizes an AND gate 150 and can not be cleared because an AND gate 151 that generates a clearing signal also is disabled. An inverter 152 inverts the AMP SENSOR before applying it to the OR gate 150.

When the OR gate 150 is energized, it applies a loading signal to a counter 153, so the counter 153 can not respond to any clocking signals. The OR gate 150 also clears a flip-flop 154. As a result, an AND gate 155 is disabled so only the DATA 2 pulses are applied to a latch 156. The latch 156 therefore remains cleared.

When a servo space reaches the heads, the SECT TIME signal may be asserted before or after the AMP SENSOR signal shifts to a non-asserted level. If the SECT TIME signal is asserted before, both the set and reset inputs to the latch 16 are energized, so the latch 146 does not change its state. Therefore, the OR gate 150 remains energized. When the AMP SENSOR signal terminates, however, the inverter 152 energizes the OR gate 150, so it remains energized, even though the latch 146 is cleared when the AND gate 147 is deenergized. If the SECT TIME signal is asserted after the AMP SENSOR signal shifts to a non-asserted level, the inverter 152 provides second energizing input to the OR gate 150. The AND gate 147 also is deenergized. When the SECTOR TIME signal is then asserted, the AND gate 151 is energized and clears the latch 146. In either case, the OR gate 150 is now conditioned to terminate its output signal when the AMP SENSOR signal shifts to an asserted state after the first set of servo blocks 45 (FIG. 2B) comprising the S1 and S1 signals passes the heads.

When the OR gate 150 is deenergized, the next DATA 2 pulse sets the flip-flop 154 because it is conditioned to be set by an inverter 157. The DATA 2 pulse also passes through an OR gate 160 to increment the counter 153 from an initial value at the beginning of each successive data cycle thereby to count a predetermined number of data cycles. Initially a carry (CRY) signal is not asserted, so the trailing edge of the next DATA 2 pulse in succession sets an integrator enable flip-flop 161 thereby to enable both E1 and E2 integrator and polarity detector circuits 162 and 163. With the flip-flop 143 cleared, only the E1 circuit 162 responds and begins to integrate the signals from the latch 156.

With the flip-flop 154 set, the DATA 1 and DATA 2 pulses now alternately set the latch 156 through the AND gate 155 and clear the latch 156. Thus the latch 156 produces square wave output signals that have the same duty cycle as the composite RS' waveform shown in FIG. 2C.

When the predetermined number of cycles have been counted, the counted 153 generates the CRY signal that clcocks the flip-flop 143 to a set state to trigger a monostable multivibrator 165. This stores the output from the E1 detector circuit in 162 a sample and hold circuit 165. Whenever the integration produces a null, a null detector 166 generates a READY-TO-R/W pulse that indicates that the head is exactly positioned on a data track. The CRY signal also conditions the flip-flop 161 to be cleared to terminate the integration.

After the blocks on the set 44 pass, the AMP SENSOR signal again shifts to a non-asserted level thereby reenergizing the OR gate 150 to preload the counter 153 and to clear the flip-flop 154 and the integrate enable flip-flop 161. When the CRY signal terminates, it clears the flip-flop 144 because the flip-flop 143 is now set. When the second set 46 of servo blocks, comprising the S2 and S2 blocks in FIG. 2B, begin to pass the heads, the AMP SENSOR signal again shifts to an asserted state and the integration cycle repeats. However, the flip-flop 143 now is set so the E2 detector circuit 163 intergrates the signals from the latch 156 thereto to produce an E2 signal.

There is also shown in FIG. 10 a guard band flip-flop 167. As shown in FIG. 2B, the guard bands are characterized by only containing servo data blocks in one set. If the heads are positioned in either guard band, the AMP SENSOR signal is only asserted once while the SECT TIME signal is asserted. If this occurs, the trailing edge of the SECT TIME signal sets the flip-flop 167 and generates a GUARD BAND signal as the flip-flop 143 is set.

Figure 11:
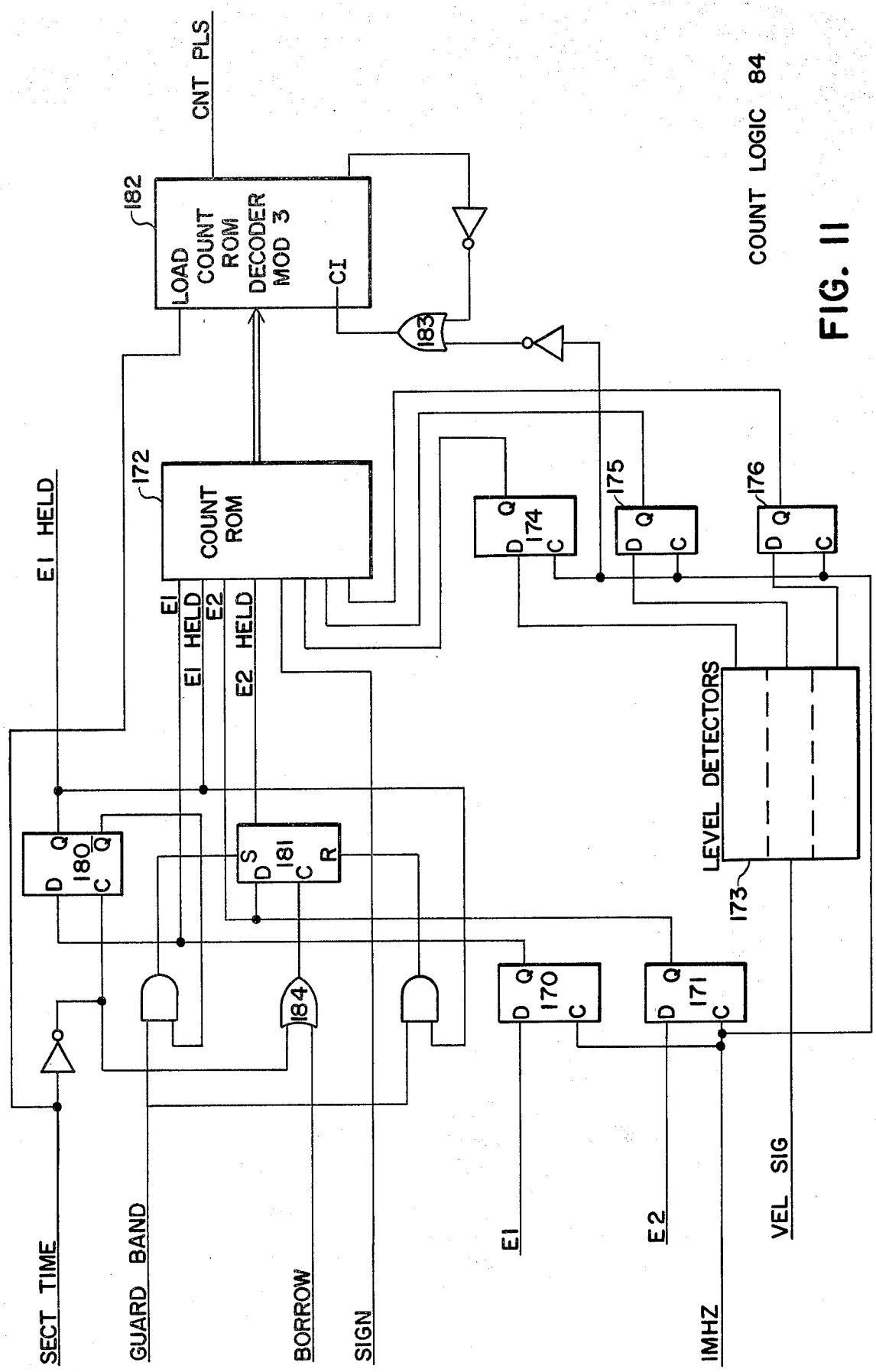
FIG. 11 is a detailed logic diagram of count logic circuit shown in FIG. 1.

The foregoing signals are applied to the count logic circuit 84 shown in FIG. 11. This circuit uses the E1 and E2 signals from successive servo areas, the SIGN signal indicating the direction of head motion, velocity signals from the tachometer, and other signals to determine the number of tracks that are traversed between successive servo areas. More specifically, the circuit in FIG. 11 receives the BORROW signal from the tracks difference counter 114 and the SIGN signal from the latch 113 in FIG. 6, the SECT TIME signal from the latch 135 in FIG. 9, the GUARD BAND signal from the flip-flop 167 in FIG. 10 and a VEL SIG signal from the tachometer circuit 32 in FIG. 1. When the SEC TIME signal is asserted at the beginning of a sector, the sector timer 130 begins to generate a 1MHZ timing pulse that clock the E1 and E2 signal into flip-flops 170 and 171 respectively. The outputs from these flip-flops are applied to a count read-only memory 172. The VEL SIG signal from the tachometer is fed to a number of level detectors 173 and the 1MHZ clocks a measure of the resultant level into flip-flops 174, 175 and 176 respectively. These signals are also applied as address signals to the count read-only memory 172.

The trailing edge of the SECT TIME signal clocks flip-flops 180 and 181 to reflect the E1 and E2 values that existed for the prior servo area. The outputs of the flip-flops 180 and 181 also constitute input address signals to the count read-only memory 172. As previously indicated, a comparison of the E1 and E2 signals for successive servo areas coupled with information concerning the direction of motion represented by the SIGN signal and the velocity represented by the signals in the flip-flops 174 through 176 enable a number of tracks to be calculated. This track number, for each possible combination of input signals, is stored at location in the memory 172 having addresses corresponding to the various conditions. When the SECT TIME signal shifts to a non-asserted level at the end of the sector time, an overriding loading signal is removed from a count read-only memory decoder 182. The number represents the number of tracks traversed through the end of the sector time. The decoder 182 is a counter having a modulus determined by a feedback circuit including an OR gate 183. The modulus corresponds to the maximum number of tracks that can be traversed between successive servo spaces. Once the loading signal is removed, the decoder 182 responds to each 1MHZ pulse by generating one CNT PLS pulse that decrements the track difference counter 114 in FIG. 6. As previously indicated, the termination of the SECT TIME signal also loads the current E1 and E2 signals into the latches 180 and 181 to serve as the E1 HELD and E2 HEAD signals when the next servo area passes the heads.

If, during a counting operation, the track difference counter reaches zero, the trailing edge of the CNT PLS pulse that reduces the difference to zero causes the counter 114 to generate the BR signal thereby energizing an OR gate 184 thereby to inhibit any change in the E2 HELD signal. This signal is thereafter used by the seek read-only memory control 125 in FIG. 8 to establish the DIRECTION signal for controlling the inverting circuit 71 in FIG. 5 during the positioning mode.

Still referring to FIG. 8, the GUARD BAND, SIGN, E1 HELD and E2 HELD signals, together with the status signals from the memory 123 are applied to the control circuit 125. From this information, control circuit 125 retrieves appropriate the DIRECTION, VEL CMD 1, VEL CMD 2 and RESET TRK CNT signals. The VEL CMD and VEL CMD 2 signals are also applied to the velocity read-only memory 120 in FIG. 6 to establish, in conjunction with signals from the track difference counter, the head velocity.

When the interface drive logic circuit 80 in FIG. 6 receives a drive command that includes a track difference, the disk drive immediately shifts to a velocity mode. The various signals then establish a characteristic initial velocity for the heads and the DC servo control circuit begins to move the heads in the proper direction. As the track difference approaches zero, the velocity reduces to a low value that assures only one track at most, will be crossed during the interval between the passage of successive servo areas. Thus, the memory produces 0 count outputs until the E2 signal changes state whereupon the last CNT PUL pulse is generated and the BR signal is asserted. Now the head is still moving toward the track, but is offset by approximately one-half track, and the circuitry shifts to a positioning mode.

During the positioning mode, only the E1 signal is used to determine an error while the E2 HELD signal controls the of the error signal. The integration of the E1 signal initially produces a large error signal that is reduced to a null value as the read-write head is centered on the track. At this point, the composite RS' has a 50% duty cycle and produces equal, but opposite, alternate integrations. Thereafter, the E1 signals are used to maintain the correct position. The relative direction of any deviation of the head from the track centerline is determined by the E2 HELD signal. The E2 HEAD signal remains constant.

From the foregoing arrangement, it will be apparent that there has been disclosed a transducer servo mechanism which accurately locates reading and writing heads over individual tracks in a disk drive unit by using in data servo information in two angularly displaced sets of radially adjacent blocks. The radially adjacent blocks containing recordings of asymmetrical, complementary, time displaced signals that all can be recorded at the same frequency. Thus, the servo information is easily recorded. As this servo information, together with a velocity signal accurately indicates a number of tracks that may have been passed across during successive sample intervals, it is not necessary to limit head travel to one track per interval. Thus, more rapid seeking operations can be performed. Moreover, the circuitry for seeking and for positioning the heads is essentially the same so added specialized circuitry found in some prior disk drives is eliminated. In this embodiment the velocity measurements can be quite coarse, so the tachometer and the velocity detecting circuitry can be quite simple. Finally, in this embodiment, each head is selected independently, so problems of aligning the heads with each other are reduced.

In summary, the disclosed transducer system is simple, reliable and inexpensive. It will be apparent from the foregoing description, however, that there are many alternate embodiments of the specifically disclosed circuitry. Such alternate embodiments could be implemented while attaining some or all of the various advantages of this invention. Therefore, it is an object of the appended claims to cover all such variations and modifications as come within the true spirit and scope of this invention.

What I claim as new and desire to be secure by Letters Patent of the United States is:

1. A disk drive unit for use in a secondary storage facility in a data processing system, said disk drive unit comprising:
   A. a magnetic disk having a plurality of concentric magnetic tracks on a surface of said magnetic disk and centered on circular track centerlines, at least one track including a plurality of circumferentially spaced data sectors for recording data and first and second sets of spaced servo information blocks recorded in servo areas between adjacent data sectors, each said set including recordings of first and second asymmetrical, time-displaced, complementary signals located alternately in radially adjacent blocks, the blocks in said first set being positioned with boundaries between adjacent blocks being aligned with track centerlines and the blocks in said second set be centered on the track centerlines,
   B. means for rotating said magnetic disk,
   C. movable transducer means positioned adjacent a surface of the disk for generating read signals in response to the recordings on said disk surface, and
   D. servo controller means connected to said movable transducer means and responsive to the read signals produced by the recordings in said servo areas for locating said movable transducer means with respect to a data sector.

2. A disk drive unit as recited in claim 1 wherein said servo controller includes:
   i. sector signal means for generating a sector signal that indicates the passage of a servo area by said movable transducers,
   ii. servo error means enabled by the sector signal means for generating a servo error signal in response to the read signals generated while a servo area passes said movable transducer means, and iii. servo control means for energizing said movable transducer means in response to the servo error signal.

3. A disk drive unit as recited in claim 2 additionally including sample interval means responsive to the sector signal and to the signals from said movable transducer means for indicating when each of said first and second sets of servo information blocks passes said movable transducer means.

4. A disk drive unit as recited in claim 3 wherein said servo controller includes means for generating a first mode signal when said transducers are positioned at a designated magnetic track on said magnetic disk and wherein said servo error means includes integration means connected to said sector signal means and said movable transducer means for integrating the read signals generated when the first set of servo information blocks passes said movable transducer means and output means responsive to said integration means for generating the servo error signal when the said first blocks pass said movable transducer means.

5. A disk drive unit as recited in claim 4 wherein said servo error means additionally includes means responsive to said integration means and said sample interval means for integrating the read signals produced when said second blocks pass said movable transducer means to control the slope of servo error signal transmitted to said servo control means.

6. A disk drive unit as recited in claim 4 wherein said servo error means additionally includes means responsive to the sector signal means and the passage of said first block of information for defining a first sampling subinterval during which said integration means integrates the read signals over the subinterval and holding means responsive to the completion of the subinterval for storing the output signal from said integration means as the servo error signal.

7. A disk drive unit as recited in claim 6 wherein said servo error means additionally comprises null detection means connected to the output of said holding means for generating a null signal when the integration produces a null value thereby indicating the proper positioning of said movable transducer means over a data track.

8. A disk drive unit as recited in claim 3 wherein said servo controller additionally includes:
   iv. track difference means for storing track displacement information corresponding to a number of tracks said movable transducer means is to be moved,
   v. means connected to said track difference means for generating a velocity magnitude signal in response to the information from said track difference means,
   vi. means for comparing the output signals produced by said integration means for successively sampled servo areas,
   vii. velocity measuring means for generating a velocity signal that is dependent upon the velocity of said movable transducer means,
   viii. direction means for generating a direction signal,
   ix. calculation means responsive to the direction means, said comparison means and said velocity measuring means for generating means for signals that indicate the number of tracks traversed by said movable transducer means during the successive samples, and
   ix. updating means for altering the displacement information in said track difference means.

9. A disk drive unit as recited in claim 8 wherein said servo error means additionally comprises storage means responsive to said sector signal means for storing the output signals from said integration means after each servo information areas passes said movable transducer means.

10. A disk drive unit as recited in claim 8 wherein said updating means includes means responsive to said sector signal means for enabling said updating means to alter said track difference means.

11. A disk drive unit as recited in claim 3 wherein said servo error means includes:
   iv. first and second integration means responsive to said sector signal means and said sample interval means for integrating the read signals generated by the passage of said first and second sets of servo information blocks passed said movable transducer means,
   v. means responsive to motion of said transducer means for generating a transducer velocity signal,
   vi. means for generating signals indicating the number of the tracks between the actual and desired track positions of said movable transducer means,
   vii. means responsive to said difference means for generating a position error signal when the movable transducer means are at the desired track and a velocity error signal when they are displaced from said desired track
   viii. means for transferring to said difference means the difference signals and a sign signal,
   ix. means responsive to said difference means for generating a velocity reference signal,
   x. means responsive to the sign signal, velocity signal and velocity mode signal for generating the velocity error signal,
   xi. means responsive to the velocity signal for comparing the integration signals for successive servo areas,
   xii. means for responsive to the velocity signal, the sign signal and said successive integrations for generating a track number corresponding to the number of tracks traversed by said movable transducer means between the passage of said successive servo area,
   xiii. means responsive to the track number for altering the contents of said track difference means to reflect the change in position,
   xiv. means responsive to the position mode signal for sampling said first integration means and the direction signal thereby to generate a position error signal, and
   xv. means responsive to the position and velocity mode signals for selectively conveying one of said positioning and velocity error signals to said servo control means as the servo error signal.

12. A disk drive unit as recited in claim 11 wherein said sector signal means includes a sector disk having indicia disposed about the periphery thereof that are in alignment with each servo area, transducer means for sensing the passage of said indicia and circuit means responsive to said transducer means for generating the sector signals and said interval sampling means includes means responsive to the signals from said movable transducer means and said circuit means for generating an amplitude sensed signal whenever the read signals exceed a threshold.

13. Apparatus as recited in claim 11 wherein said servo controller includes servo means responsive to the servo error signal and means responsive to the velocity signal for generating a signal that is applied to said movable transducer means.

14. A disk drive unit as recited in claim 11 wherein said magnetic disk includes two surfaces having servo information recorded thereon and said movable transducer means includes first and second transducers adjacent the first and second surfaces on said disk and means for selectively generating the read signals in response to the signals from one of said transducers.

15. A disk drive unit for use in a secondary storage facility that includes a controller for transmitting, to said drive, command signals including a track displacement value and a sign value, said disk drive unit comprising:
  A. a magnetic disk having a plurality of concentric magnetic tracks on a surface of said magnetic disk and centered on circular track centerlines, at least one track being divided to a plurality of circumferentially spaced data sectors for recording data and first and second sets of spaced servo information blocks recorded in servo areas between adjacent data sectors, each said set including recordings of first and second asymmetrical, time-displaced, complementary signals located alternately in radially adjacent blocks, the blocks in said first set being positioned with boundaries between adjacent blocks being aligned with track centerlines and the blocks in said second set be centered on the track centerlines,
  B. means for rotating said magnetic disk,
  C. movable transducer means positioned adjacent a surface of the disk for generating read signals in response to the recordings on said disk surface, and
  D. servo mechanism means for positioning the heads in response to a servo error signal, said servo mechanism means including means for generating a velocity signal that represents the velocity of said movable transducer means across said magnetic disk,
  E. read-write circuit means responsive to the signals from said transducer means for generating read signals in response to the recordings on said magnetic disk,
  F. means for generating first and second sample signals indicating the passage of said first and second sets of blocks in the servo area past said transducer means,
  G. first and second integration means responsive to the read signals and to the respective ones of the first and second sample signals for generating first and second output signals in response to said sampling means,
  H. means for recording these output signals from said first and second integration means for successive servo areas,
  I. means responsive to the receipt of a drive command for storing the displacement and sign values,
  J. means responsive to a displacement value in said track difference means for generating a velocity error signal in response to the signals from said storage means, the velocity signal and the sign signal updating the track displacement value in said track difference means,
  K. means responsive to the output signal from said first integration means when said track difference means contains a zero displacement value for generating a position error signal, and
  L. means responsive to the velocity error and positioning error signals, the displacement value and the direction signal for generating the servo error signal for said servo mechanism.

16. A magnetic disk for a disk drive unit that is used in a secondary storage facility for a data processing system and that includes magnetic disk rotating means, movable transducer means and servo controller means connected to said movable transducer means, said magnetic disk being adapted for mounting on the rotating means adjacent to the movable transducer means whereby the movable transducer means generates read signals in response to recordings on the disk surface, said magnetic disk comprising a plurality of concentric magnetic data tracks on a surface of said magnetic disk that are each centered on circular track centerlines, each said data track including a plurality of circumferentially spaced data sectors for recording data and first and second sets of spaced servo information blocks recorded in servo areas between adjacent data sectors, each said set including first and second assymetrical, time displaced, complementary signals, located alternately in radially adjacent blocks, the boundaries between adjacent blocks in said first set being aligned with track centerlines and the blocks in said second set being centered on the track centerlines whereby the servo controller means is responsive to the read signals produced by the recordings in said servo areas for locating said movable transducer means with respect to said data tracks.

17. A magnetic disk as recited in claim 16 wherein the disk drive unit additionally includes sector identifying transducer means and said magnetic disk additionally includes a sector disk affixed to said magnetic disk for rotation therewith, said sector disk having indicia disposed about the periphery thereof aligned with each said servo area, the passage of said indicia past said second transducer means causing the generation of sector signals.

18. A magnetic disk as recited in claim 17 wherein said magnetic disk includes two surfaces having data tracks with servo information recorded thereon, and the movable transducer means including first and second transducers adjacent the first and second surfaces on said disk.

19. A magnetic disk as recited in claim 16 additionally comprising a set of inner guard band tracks and a set of outer guard band tracks that are concentrically disposed with respect to said data tracks, said inner and outer guard bands being recorded, respectively, with first and second assymetrical, time-displaced signals.

20. A magnetic disk as recited in claim 19 wherein the signals in said outer guard band are recorded in blocks that the radially aligned with said first set of servo blocks and are recorded with signals of the same phase as the signal of the radially outermost block of said first set of servo blocks and the signals in the inner guard band are recorded in blocks that are aligned with said second set of servo blocks and are recorded with signals of the same phase as the signal of the radially innermost block of said second set of servo blocks.

* * * * *

UNITED STATES PATENT AND TRADEMARK OFFICE
CERTIFICATE OF CORRECTION

PATENT NO. : 4,208,679
DATED : June 17, 1980
INVENTOR(S) : Hertrich

It is certified that error appears in the above-identified patent and that said Letters Patent are hereby corrected as shown below:

Column 2, line 42, after "cost" delete the semicolon ";" and insert a period --.--.
Column 3, line 48, after "read/" delete the hyphen "-".
Column 4, line 68, after "S2" (second occurrence) delete the comma ",".
Column 4, line 68, after "blocks" insert a comma --,--.
Column 5, line 1, delete "too they" and insert --then too--.
Column 6, line 57, delete " it it" and insert --it is--.
Column 9, line 54, after "signal" delete "that".
Column 9, line 59, delete "difference" and insert --difference--.
Column 10, line 17, delete "the" (third occurrence).
Column 10, line 33, after "that" insert --is--.
Column 10, line 55, after "disk" insert --is--.
Column 10, line 66, after "If" delete "the".
Column 11, line 68, delete "counted" (second occurrence) and insert --counter--.
Column 12, line 1, delete "clcocks" and insert --clocks--.
Column 12, line 20, delete "intergrates" and insert --integrates--
Column 12, line 50, after "1MHZ" insert --signal--.
Column 13, line 54, after "the" (first occurrence) insert --sign--.
Column 16, line 8, delete "areas" and insert --area--.
Column 16, line 46, delete "area" and insert --areas--.

Signed and Sealed this

Eleventh Day of November 1980

[SEAL]

Attest:

SIDNEY A. DIAMOND

Attesting Officer    Commissioner of Patents and Trademarks